United States Patent
Iijima et al.

(10) Patent No.: US 11,132,851 B2
(45) Date of Patent: Sep. 28, 2021

(54) DIAGNOSIS DEVICE AND DIAGNOSIS METHOD

(71) Applicant: TOYOTA JIDOSHA KABUSHIKI KAISHA, Toyota (JP)

(72) Inventors: Masayoshi Iijima, Nissin (JP); Takehiro Uchida, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 16/299,316

(22) Filed: Mar. 12, 2019

(65) Prior Publication Data

US 2019/0295337 A1 Sep. 26, 2019

(30) Foreign Application Priority Data

Mar. 26, 2018 (JP) .............................. JP2018-058559

(51) Int. Cl.
*G07C 5/08* (2006.01)
*G06N 20/00* (2019.01)
*G05B 23/02* (2006.01)
*H04W 4/46* (2018.01)

(52) U.S. Cl.
CPC ....... *G07C 5/0808* (2013.01); *G05B 23/0235* (2013.01); *G05B 23/0237* (2013.01); *G06N 20/00* (2019.01); *G07C 5/0841* (2013.01); *H04W 4/46* (2018.02); *G05B 2219/2637* (2013.01); *G07C 5/0825* (2013.01)

(58) Field of Classification Search
CPC ........ G05B 2219/2637; G05B 23/0235; G05B 23/0237; G07C 5/0808; G07C 5/0825; G07C 5/0841; G06N 20/00; H04W 4/46

USPC ....................................................... 701/29.3
See application file for complete search history.

(56) References Cited

U.S. PATENT DOCUMENTS

| 9,615,213 | B2 * | 4/2017 | Tibbitts | ............... B60W 50/087 |
| 9,792,656 | B1 * | 10/2017 | Konrardy | ................ B60R 21/00 |
| 10,816,980 | B2 * | 10/2020 | Hazard | .................. G06N 20/00 |
| 10,816,981 | B2 * | 10/2020 | Hazard | .................. G06N 20/00 |
| 2008/0189009 | A1 | 8/2008 | Wang et al. | |
| 2014/0350777 | A1 * | 11/2014 | Kawai | ................... G07C 5/0808 |
| | | | | 701/32.3 |
| 2015/0178997 | A1 * | 6/2015 | Ohsaki | ..................... F02D 41/26 |
| | | | | 701/29.1 |
| 2015/0363925 | A1 * | 12/2015 | Shibuya | .................. F01D 25/00 |
| | | | | 345/440 |
| 2016/0169771 | A1 * | 6/2016 | Hiruta | ................ G05B 23/0243 |
| | | | | 702/183 |
| 2017/0069146 | A1 * | 3/2017 | Sun | ..................... G06Q 30/0631 |

(Continued)

FOREIGN PATENT DOCUMENTS

| CN | 111152656 A * | 5/2020 | ................. H02J 7/14 |
| JP | 2016-157206 A | 9/2016 | |

*Primary Examiner* — Atul Trivedi
(74) *Attorney, Agent, or Firm* — Oliff PLC

(57) ABSTRACT

A diagnosis device includes a learning information acquisition unit configured to acquire a learning value of a first device mounted in at least one first vehicle present in a predetermined range from a second vehicle, a learning unit configured to calculate a learning value of a second device mounted in the second vehicle using the learning value of the first device, and a diagnosis unit configured to diagnose an operation state of the second device by comparing a detection value of the second device with the learning value of the second device.

7 Claims, 8 Drawing Sheets

(56) References Cited

U.S. PATENT DOCUMENTS

| | | | |
|---|---|---|---|
| 2017/0103101 A1* | 4/2017 | Mason | G06F 16/215 |
| 2017/0144671 A1* | 5/2017 | Memani | G06Q 10/1053 |
| 2017/0178426 A1* | 6/2017 | Ezawa | B61K 9/00 |
| 2017/0211492 A1* | 7/2017 | Winiecki | G07C 5/085 |
| 2017/0244594 A1* | 8/2017 | Shiota | H04L 41/0668 |
| 2017/0309092 A1* | 10/2017 | Rosenbaum | G01M 17/007 |
| 2017/0345231 A1 | 11/2017 | Kumabe | |
| 2017/0352201 A1 | 12/2017 | Kumabe | |
| 2017/0352265 A1 | 12/2017 | Kumabe | |
| 2017/0358154 A1* | 12/2017 | Ishikawa | G07C 5/0808 |
| 2018/0118027 A1* | 5/2018 | Hall | B60W 40/13 |
| 2018/0158255 A1* | 6/2018 | Garcia | B60Q 1/52 |
| 2018/0204393 A1* | 7/2018 | Landolsi | F02M 35/021 |
| 2018/0229744 A1* | 8/2018 | Manzari | B61L 15/0027 |
| 2019/0132709 A1* | 5/2019 | Graefe | H04W 4/38 |
| 2019/0295337 A1* | 9/2019 | Iijima | G07C 5/0808 |
| 2020/0334922 A1* | 10/2020 | Johnston | G07C 5/008 |
| 2020/0371512 A1* | 11/2020 | Srinivasamurthy | G05B 23/0281 |
| 2021/0012297 A1* | 1/2021 | Johnson | G07C 5/0825 |

* cited by examiner

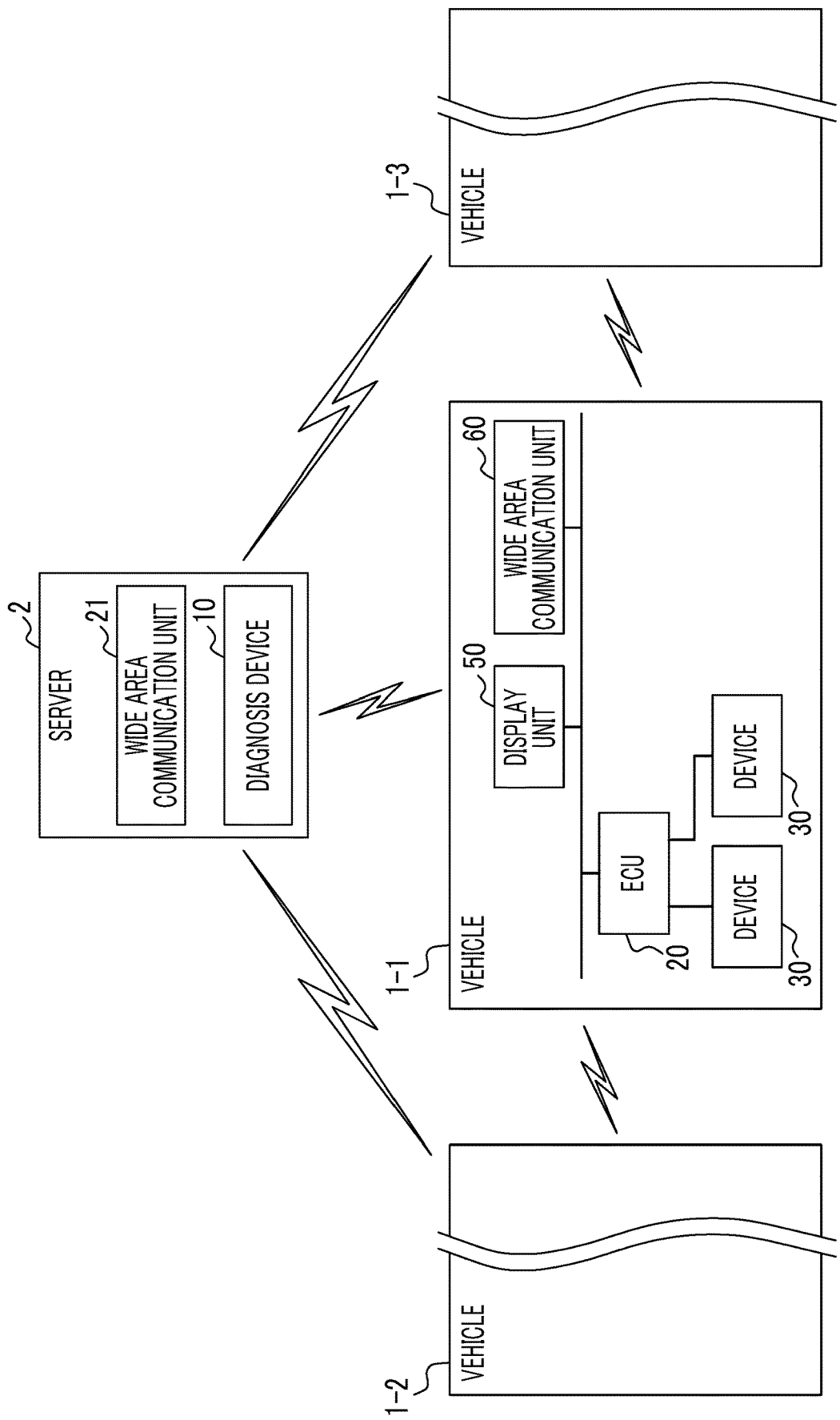

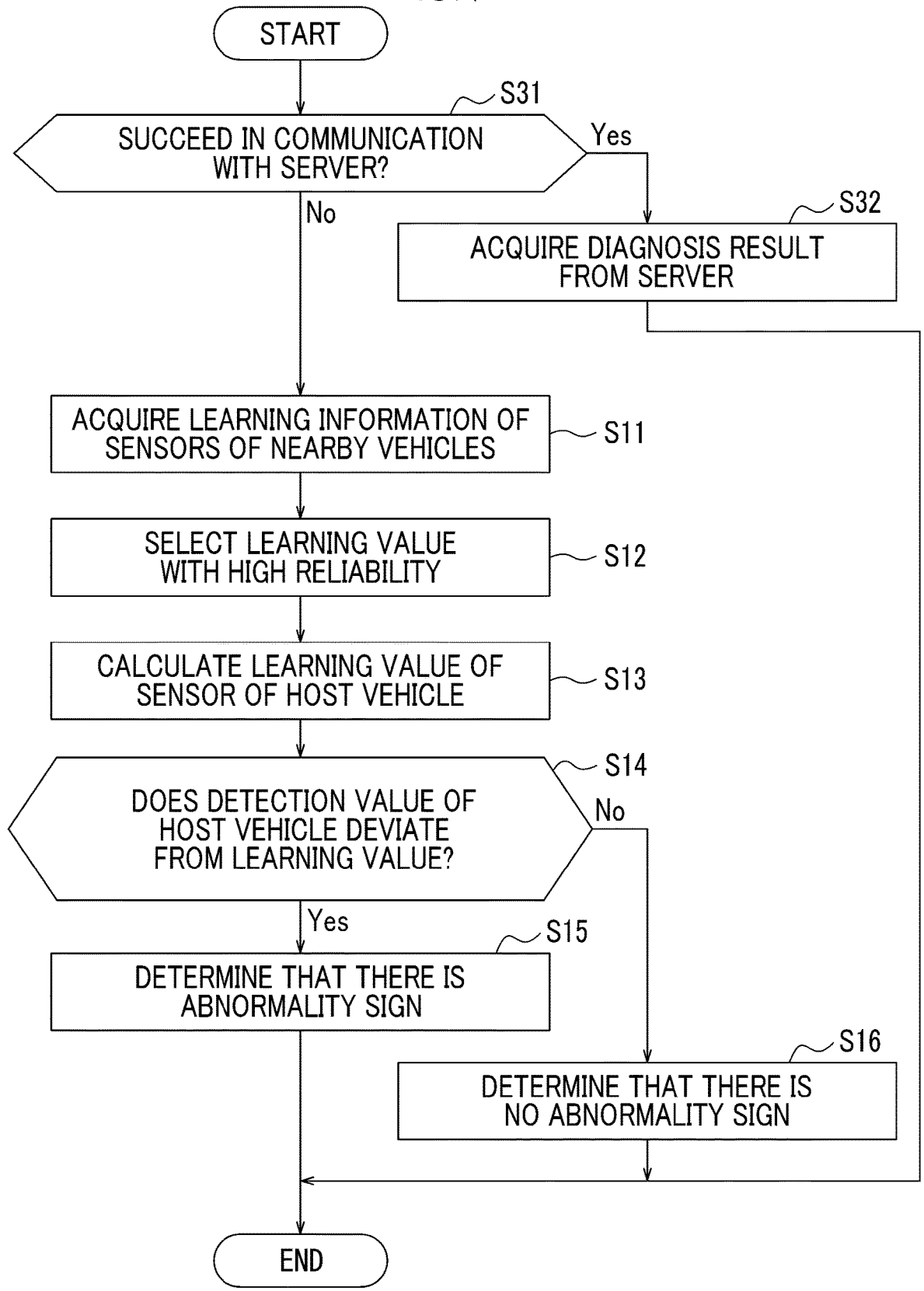

DIAGNOSIS DEVICE AND DIAGNOSIS METHOD

INCORPORATION BY REFERENCE

The disclosure of Japanese Patent Application No. 2018-058559 filed on Mar. 26, 2018 including the specification, drawings and abstract is incorporated herein by reference in its entirety.

BACKGROUND

1. Technical Field

The present disclosure relates to a diagnosis device and a diagnosis method for diagnosing an abnormality sign of a device mounted in a vehicle.

2. Description of Related Art

Technologies for diagnosing an abnormality sign of a device have been developed. For example, Japanese Unexamined Patent Application Publication No. 2016-157206 (JP 2016-157206 A) discloses a sign diagnosis system including cluster set generation means for generating a cluster set by extracting a feature quantity from cumulative data of measurement values of an inspection target device and a plurality of devices that is the same type as the target device, degree-of-abnormality calculation means for calculating a degree of abnormality based on the generated cluster set and the measurement value of the target device, cluster selection means for selecting a cluster used for prediction of an inspection timing of the target device from the cluster set based on the calculated degree of abnormality, and an inspection timing prediction means for calculating a prediction value of a device state of the target device based on the selected cluster and predicting an inspection timing of the target device based on the prediction value and a predetermined threshold value.

SUMMARY

The technology described in JP 2016-157206 A is based on the premise that each device is in the same environment. Therefore, when data of a device changes due to an external environment such as a road surface shape of a road on which a vehicle is traveling, a gradient of the road, or a weather as in a device mounted in the vehicle, it is difficult for a diagnosis of an abnormality sign to be correctly performed.

The present disclosure provides a diagnosis device and a diagnosis method capable of accurately diagnosing an abnormality sign of a device mounted in a vehicle.

A first aspect of the present disclosure relates to a diagnosis device. The diagnosis device includes a learning information acquisition unit configured to acquire a learning value of a first device mounted in at least one first vehicle present in a predetermined range from a second vehicle; a learning unit configured to calculate a learning value of a second device mounted in the second vehicle using the learning value of the first device; and a diagnosis unit configured to diagnose an operation state of the second device by comparing a detection value of the second device with the learning value of the second device.

In the diagnosis device according to the first aspect, the learning unit may be configured to calculate the learning value of the second device using the learning value of the first device when a difference between a detection value of the first device and the learning value of the first device is equal to or smaller than a threshold value.

In the diagnosis device according to the first aspect, the learning value of the first device may be calculated based on a learning value of a third device mounted in at least one third vehicle present in a predetermined range from the first vehicle; the learning information acquisition unit may be configured to acquire the learning value of the first device and the number of learning vehicles indicating the number of the third vehicles related to the calculation of the learning value of the first device in association with each other; and the learning unit may be configured to calculate the learning value of the second device using the learning value of the first device and the number of learning vehicles.

In the diagnosis device according to the aspect, the learning unit may be configured to calculate the learning value of the second device using the learning value of the first device when the number of learning vehicles associated with the learning value of the first device exceeds a threshold value.

In the diagnosis device according to the aspect, the learning unit may be configured to calculate a weighted average obtained by weighting the learning values of the first device according to the number of learning vehicles, as the learning value of the second device.

In the diagnosis device according to the first aspect, the learning unit may be configured to reset the learning value of the second device when the second vehicle is repaired or inspected.

A second aspect of the present disclosure relates to a diagnosis method. The diagnosis method includes acquiring a learning value of a first device mounted in a first vehicle; calculating a learning value of a second device mounted in a second vehicle present in a predetermined range from the first vehicle using the learning value of the first device; and diagnosing an operation state of the second device by comparing a detection value of the second device with the learning value of the second device.

According to each aspect of the present disclosure, it is possible to accurately diagnose an abnormality sign of a device mounted in a vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5 is a diagram illustrating a schematic configuration of a system including a diagnosis device according to a second embodiment of the present disclosure;

FIG. 7 is a flowchart showing an example of a procedure of a diagnosis method using the diagnosis system according to the third embodiment of the present disclosure.

DETAILED DESCRIPTION OF EMBODIMENTS

Hereinafter, embodiments of the present disclosure will be described in detail with reference to the drawings.

First Embodiment

Figure 1:
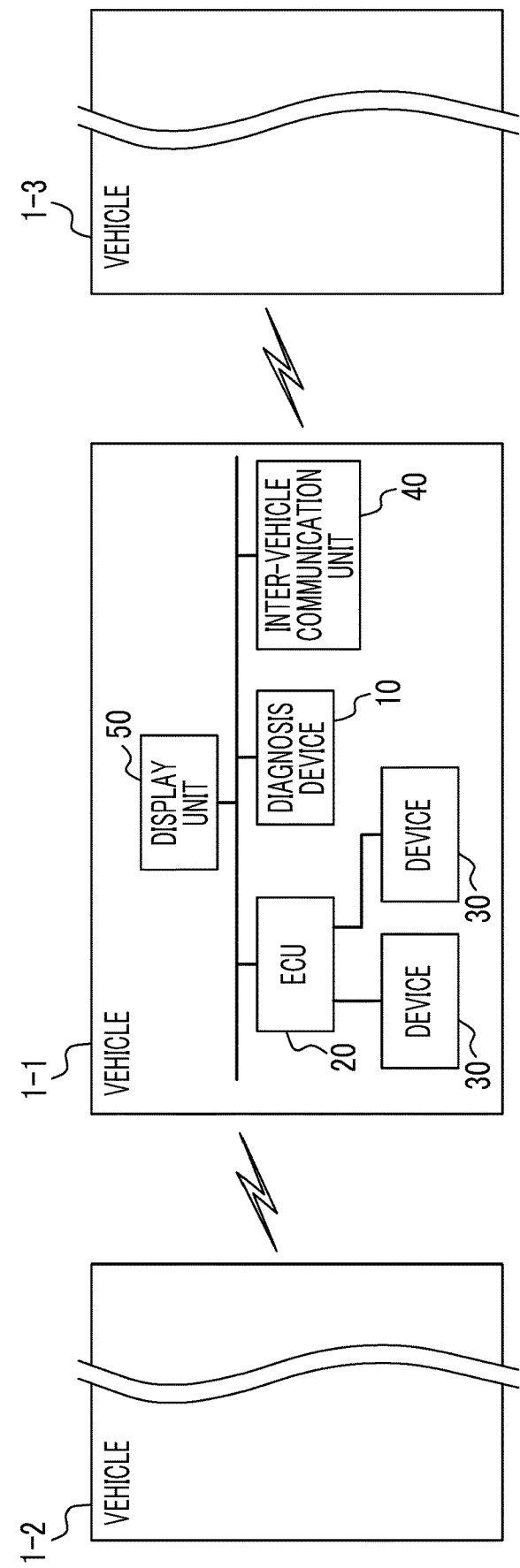
FIG. 1 is a diagram illustrating a schematic configuration of a vehicle including a diagnosis device according to a first embodiment of the present disclosure.

FIG. 1 is a diagram illustrating a schematic configuration of a vehicle including a diagnosis device according to a first embodiment. Each vehicle 1 includes a diagnosis device 10, an electronic control unit (ECU) 20, a device 30, an inter-vehicle communication unit 40, and a display unit 50. For convenience of description, in FIG. 1, solely three vehicles 1-1, 1-2, 1-3 having the same configuration are illustrated. In the first embodiment, the vehicle 1-1 is referred to as a host vehicle (an example of a second vehicle), and the vehicle 1-2 and the vehicle 1-3 are nearby vehicles (examples of a first vehicle) present in a predetermined range from the vehicle 1-1. Here, the predetermined range is, for example, a range in which inter-vehicle communication is possible.

Since a sensor deteriorates over time, a detection value of the sensor may gradually deviate from a normal value, so that a control value of an actuator based on the detection value of the sensor also deviates from a normal value. Therefore, in the present disclosure, the detection value of the sensor or the control value of the actuator is monitored so as to diagnose the sensor.

The device 30 is a sensor or an actuator, and a detection value of the device 30 means a detection value (a sensor value) of the sensor or the control value of the actuator. Hereinafter, in the embodiment of the present specification, the device 30 will be described as the sensor 30. Various sensors 30 such as an outside air temperature sensor, an intake air temperature sensor, a water temperature sensor, a vehicle speed sensor, an $O_2$ sensor, a steering sensor, an air pressure sensor, an ultrasonic sensor, a gyro sensor, and an obstacle sensor are mounted in the vehicle 1. The detection value of the sensor 30 is output to the ECU 20 that performs a process using the detection value.

A plurality of ECUs 20 is mounted in the vehicle 1 and electronically controls various operations of the vehicle 1. For example, the ECU 20 for an engine drives the actuator based on information from the sensors 30 such as the intake temperature sensor, the water temperature sensor, the vehicle speed sensor, the $O_2$ sensor, and the like, and controls an amount of fuel injection or an injection time of the engine.

The inter-vehicle communication unit 40 performs direct communication (inter-vehicle communication) between the vehicles 1 using radio waves in a frequency band assigned in advance, and receives and demodulates learning information of the sensor 30 (a first device) mounted in the nearby vehicles 1-2, 1-3 from the nearby vehicles 1-2, 1-3. Further, the inter-vehicle communication unit 40 modulates learning information of the sensor 30 (a second device) mounted in the host vehicle 1-1 and transmits the learning information to the nearby vehicles 1-2, 1-3. The inter-vehicle communication unit 40 is capable of communicating with nearby vehicles present in a coverage of the radio waves. The coverage of the radio waves can be appropriately adjusted by adjusting intensity of the radio waves. The inter-vehicle communication unit 40 outputs the received learning information to the diagnosis device 10. The inter-vehicle communication unit 40 transmits and receives the learning information at any frequency. Once inter-vehicle communication unit 40 performs the communication with the same vehicle, the inter-vehicle communication unit 40 may not perform communication until a predetermined period of time elapses in order to restrict communication with the same vehicle many time.

The diagnosis device 10 determines whether or not there is a sign of abnormality such as a failure of the sensor 30 mounted in the host vehicle 1-1 based on the learning information received by the inter-vehicle communication unit 40 through inter-vehicle communication.

The display unit 50 is, for example, a panel display or a head up display, and displays a diagnosis result or the like of the diagnosis device 10.

Figure 2:
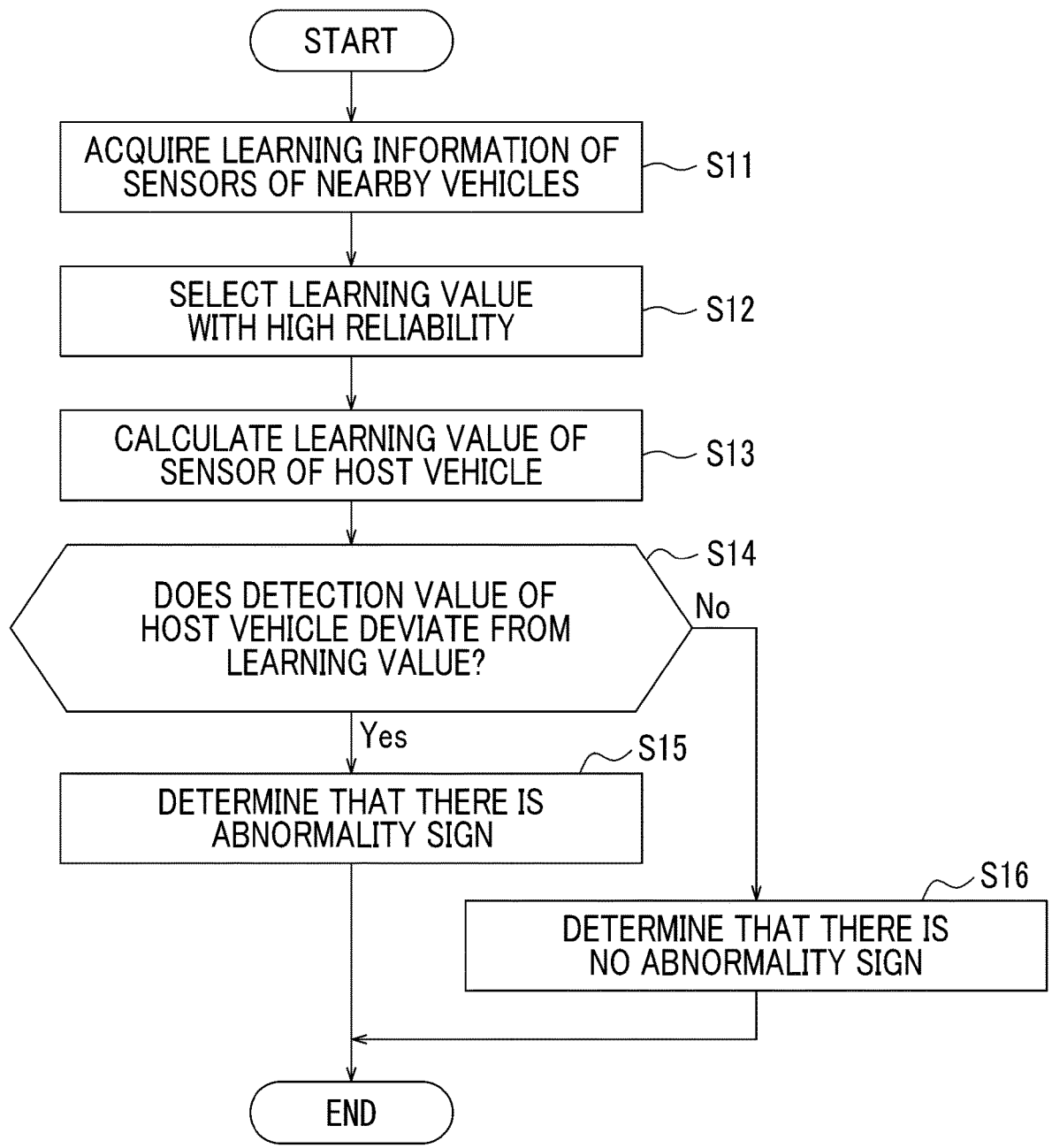
FIG. 2 is a flowchart showing an example of a procedure of a diagnosis method using the diagnosis device according to the first embodiment of the present disclosure.

Processing content of the diagnosis device 10 will be described in greater detail with reference to FIGS. 3 and 4A to 4C after an overview is described with reference to FIG. 2. FIG. 2 is a flowchart showing an example of a procedure of a diagnosis method using the diagnosis device 10.

The diagnosis device 10 acquires learning information with respect to the sensors 30 mounted in the nearby vehicles 1-2, 1-3 through inter-vehicle communication (step S11). Then, the diagnosis device 10 selects a learning value with high reliability from the acquired learning information (step S12). A learning value of the sensor 30 mounted in the host vehicle 1-1 is calculated using the learning value with high reliability (step S13). The learning value of the sensor 30 indicates a value obtained by estimating a normal value of the detection value of the sensor 30. Specific examples of the processes of steps S12 and S13 will be described below. The process of step S12 can be omitted.

The diagnosis device 10 compares the detection value of the sensor 30 mounted in the host vehicle 1-1 with the calculated learning value (step S14), and when both deviate (Yes in step S14), the diagnosis device 10 determines that there is an abnormality sign of the sensor 30 mounted in the host vehicle 1-1 (step S15), and when both do not deviate (No in step S14), the diagnosis device 10 determines that there is no abnormality sign of the sensor 30 mounted in the host vehicle 1-1 (step S16).

Figure 3:
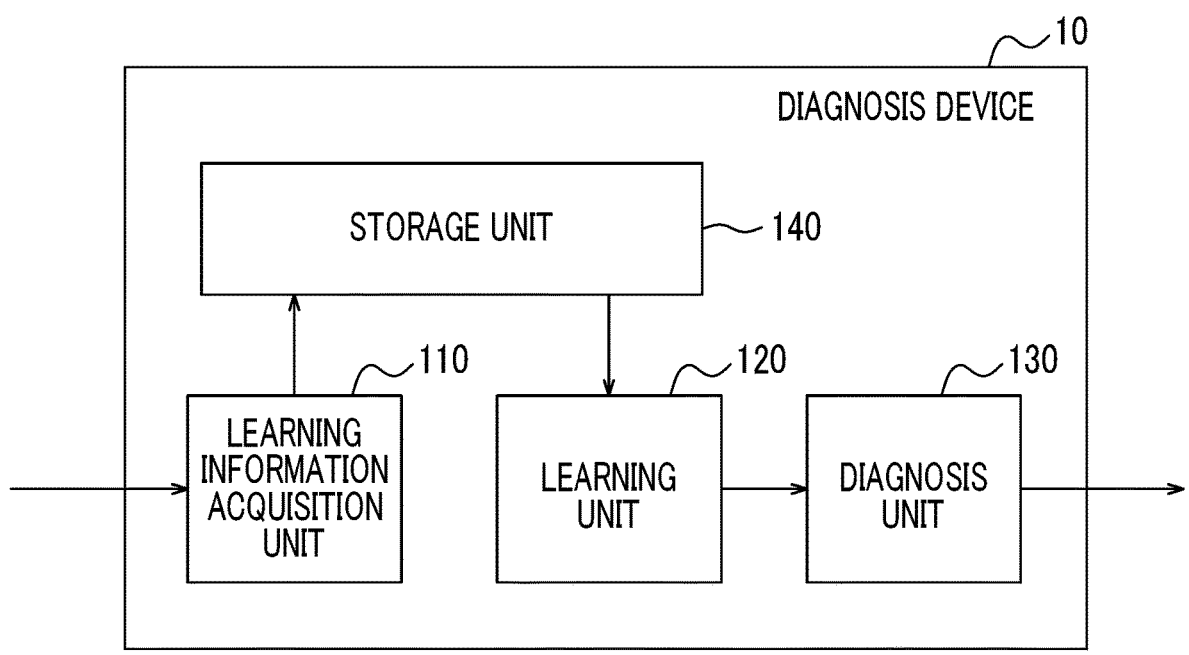
FIG. 3 is a diagram illustrating a configuration example of the diagnosis device according to the first embodiment of the present disclosure.

FIG. 3 is a diagram illustrating a configuration example of the diagnosis device 10. The diagnosis device 10 illustrated in FIG. 3 includes a learning information acquisition unit 110, a learning unit 120, a diagnosis unit 130, and a storage unit 140.

The learning information acquisition unit 110 performs the process of step S11 described above. That is, the learning information acquisition unit 110 instructs the inter-vehicle communication unit 40 to receive the learning information of the nearby vehicles 1-2, 1-3 through inter-vehicle communication. The learning information acquisition unit 110 acquires learning information of the sensors 30 mounted in the nearby vehicles 1-2, 1-3 from the inter-vehicle communication unit 40 and outputs the acquired learning information to the storage unit 140.

The learning unit 120 performs the processes of steps S12 and S13 described above. That is, the learning unit 120 determines the reliability of the learning value included in the learning information stored in the storage unit 140, and discards the learning information including the learning value with low reliability. The learning unit 120 calculates a learning value of the sensor 30 mounted in the host vehicle 1-1 based on the learning value with high reliability, and outputs the calculated learning value to the diagnosis unit 130.

The diagnosis unit 130 performs the processes of steps S14 to S16 described above. That is, for each sensor 30 mounted in the host vehicle 1-1, the diagnosis unit 130 compares the detection value of the sensor 30 with the learning value calculated by the learning unit 120. When a difference between both exceeds a preset threshold value (the detection value of the host vehicle 1-1 deviates from the learning value), the diagnosis unit 130 determines that there is an abnormality sign of the sensor 30. When the difference between both is equal to or smaller than the threshold value (the detection value of the host vehicle 1-1 does not deviate from the learning value), the diagnosis unit 130 determines that there is no abnormality sign of the sensor 30. The diagnosis unit 130 outputs a diagnosis result to the display unit 50, a speaker, an external server, or the like. When the diagnosis unit 130 determines that there is an abnormality sign of the sensor 30 of the host vehicle 1-1, the diagnosis unit 130 may not transmit the learning information of the sensor 30 to the nearby vehicles 1-2, 1-3.

Figure 4A:
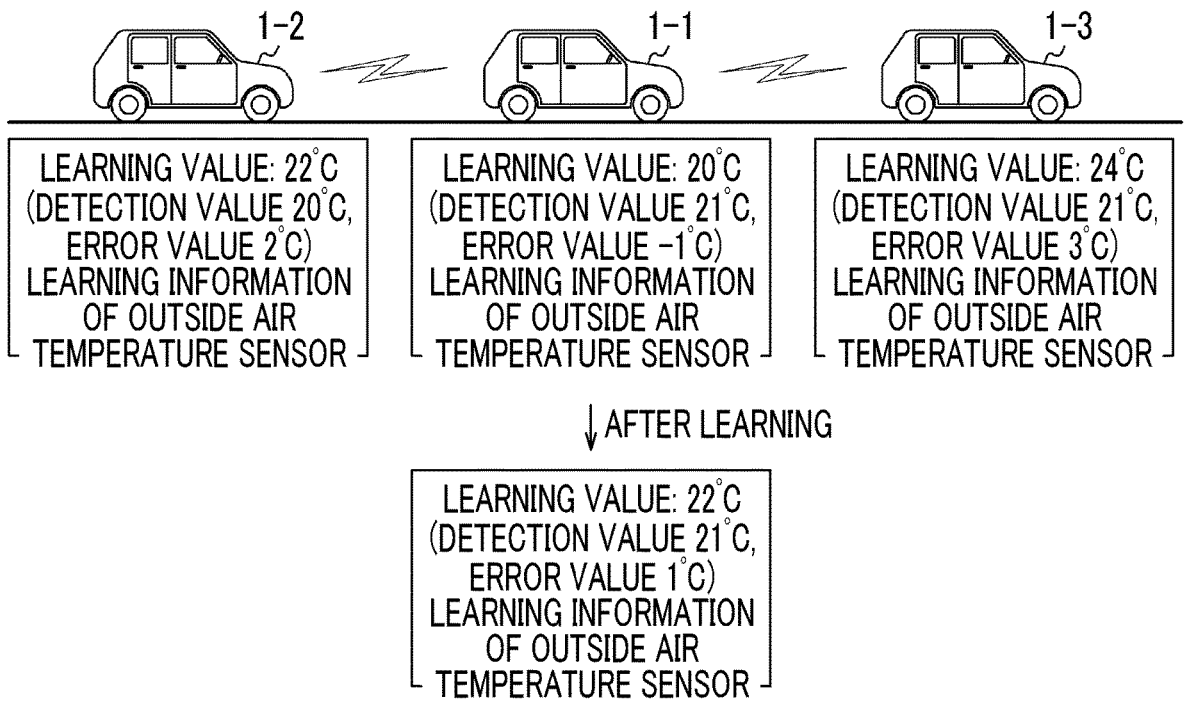
FIG. 4A is a diagram illustrating a diagnosis example by a diagnosis device according to the first embodiment of the present disclosure.
Figure 4B:
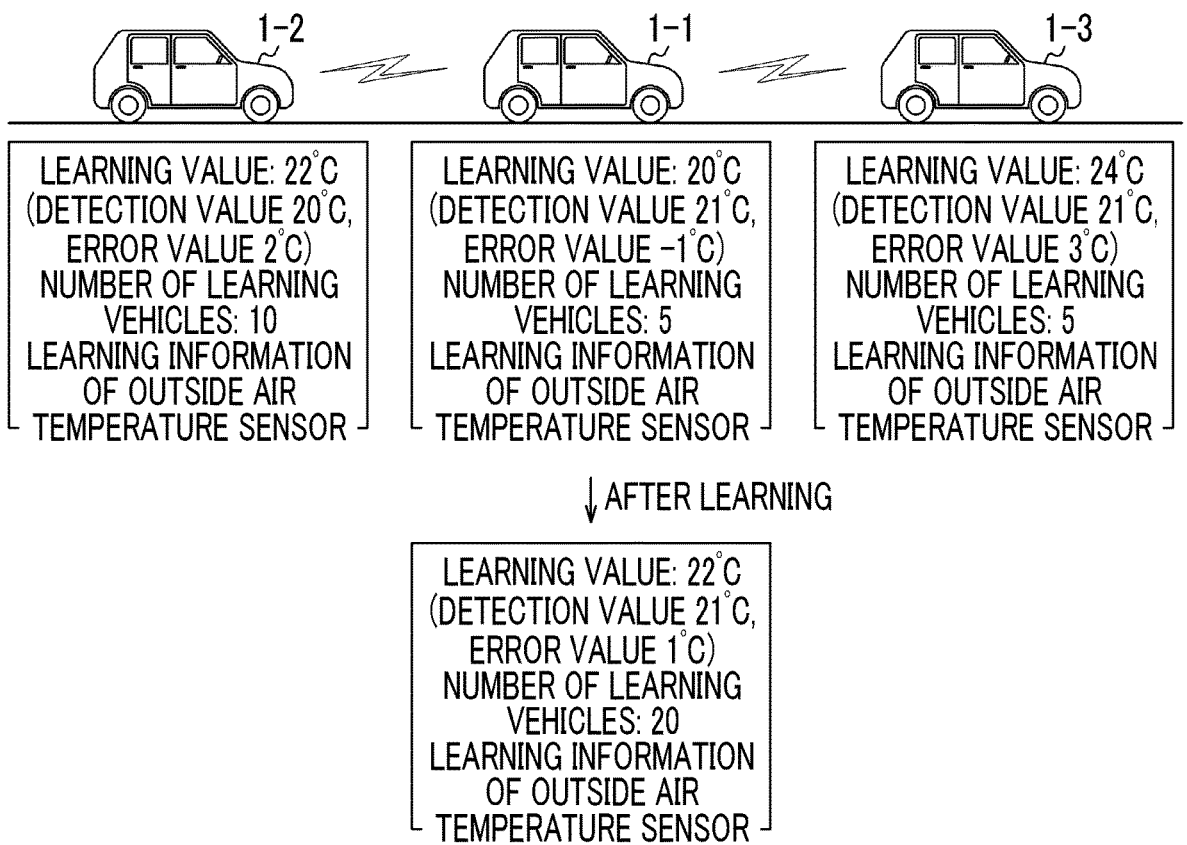
FIG. 4B is a diagram illustrating a diagnosis example by the diagnosis device according to the first embodiment of the present disclosure.
Figure 4C:
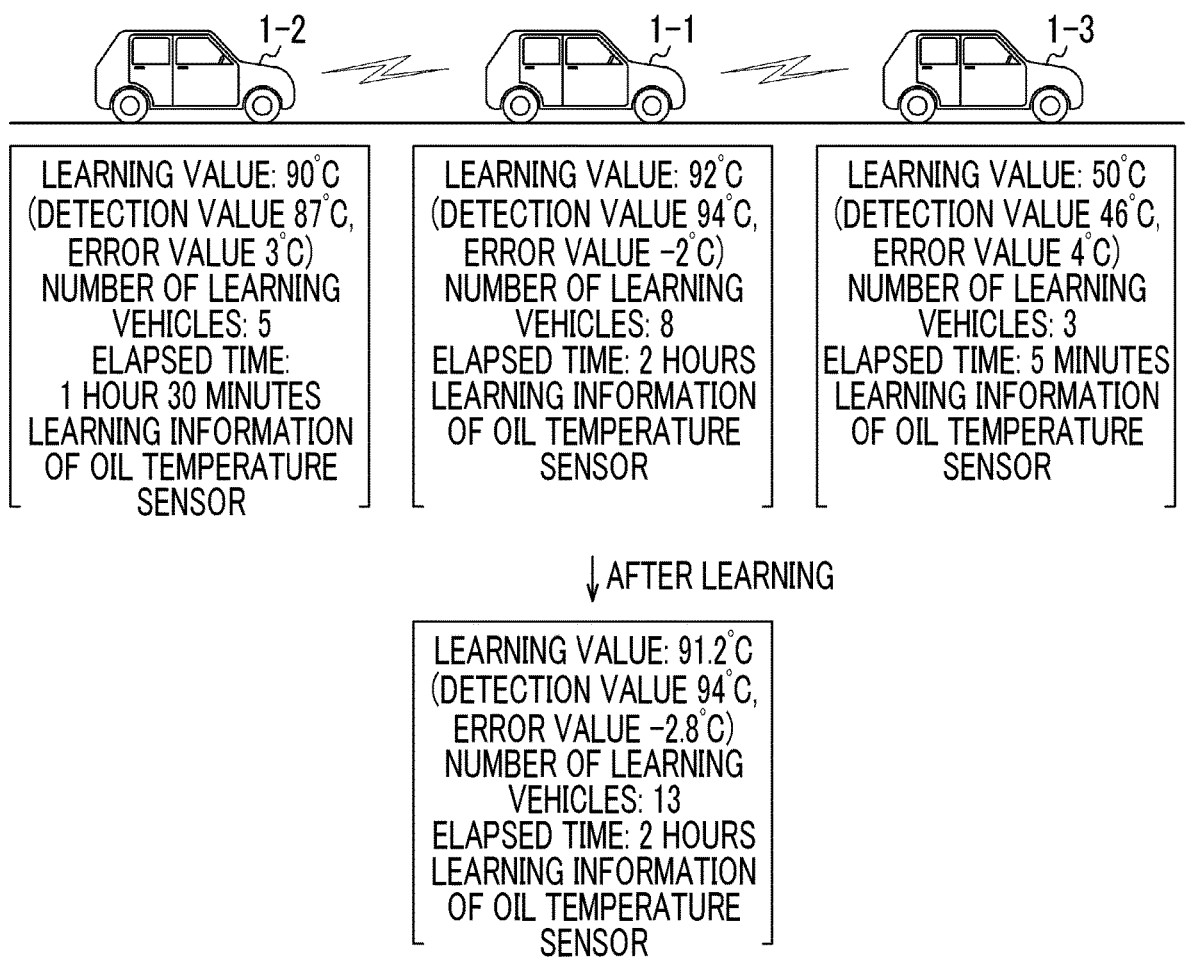
FIG. 4C is a diagram illustrating a diagnosis example by the diagnosis device according to the first embodiment of the present disclosure.

FIGS. 4A to 4C are diagrams illustrating specific examples of the diagnosis of the detection value in the diagnosis device 10. In the example illustrated in FIGS. 4A to 4C, it is assumed that the host vehicle 1-1 newly receives the learning information of the sensor 30 from the nearby vehicles 1-2, 1-3. The learning value of the sensor 30 mounted in a certain vehicle is calculated based on the learning information of the sensors 30 mounted in nearby vehicles present in a predetermined range from the vehicle. That is, the learning value of the sensor 30 mounted in the host vehicle 1-1 is calculated based on the learning information of the sensors 30 mounted in the nearby vehicles 1-2, 1-3. Further, the learning value of the sensor 30 mounted in the vehicle 1-2 is calculated based on the learning information of the sensor 30 mounted in the vehicle around the vehicle 1-2, and the learning value of the sensor 30 mounted in the vehicle 1-3 is calculated based on the learning information of the sensor 30 mounted in the vehicle around the vehicle 1-3.

When the detection value of the sensor 30 is X and the learning value is Y, information on the error value may be included in the learning value, and the error value may be expressed as "detection value X, error value (Y−X)". That is, the learning value is a sum of the detection value and the error value. For example, in FIG. 4A, the learning value in the vehicle 1-1 may be represented as "detection value 21° C., error value −1° C." instead of being represented as "20° C.". By including the information on the error value, it can be estimated that reliability of the learning value is likely to be low when the error value is great. Therefore, the learning unit 120 may discard the learning information when the error value exceeds the threshold value from among the learning information stored in the storage unit 140, and calculate the learning value of the sensor 30 mounted in the host vehicle 1-1 using the learning value in which the error value (a difference from the detection value) is equal to or smaller than the threshold value.

The host vehicle 1-1 may not receive the learning information from the nearby vehicles 1-2, 1-3 from which the host vehicle 1-1 has once received the learning information, until a predetermined time or more has elapsed. For example, an identification ID for identifying a vehicle may be included in the learning information, and the learning information acquisition unit 110 may discard newly acquired learning information when an identification ID included in the newly acquired learning information is the same as an identification ID included in learning information acquired in the past and a difference in acquisition time between the learning information is equal to or shorter than a predetermined time.

In FIGS. 4A and 4B, the learning information is learning information with respect to the outside air temperature sensor 30, and in FIG. 4C, the learning information is learning information with respect to the oil temperature sensor 30. In FIG. 4A, when the learning unit 120 of the host vehicle 1-1 calculates the learning value of the outside air temperature sensor 30 mounted in the host vehicle 1-1 using the learning information acquired from the nearby vehicles 1-2, 1-3, the learning unit 120 sets the learning value of the outside air temperature sensor 30 mounted in the host vehicle 1-1 to, for example, an average value of learning values (22+20+24)/3=22[° C.] of the outside air temperature sensor 30 mounted in the host vehicle 1-1 and the nearby vehicles 1-2, 1-3.

Further, the number of vehicles 1 (the number of learning vehicles) related to the calculation of the learning value may be included in the learning information, and the learning value is associated with the number of learning vehicles, as illustrated in FIG. 4B. The learning information of the vehicle 1-2 indicates that the learning value "22° C." has been calculated using the learning information of the outside air temperature sensor 30 of "10" vehicles 1. When the number of learning vehicles is "one", this indicates that the learning value is an initial value or a value after resetting. The initial value of the learning value is, for example, a detection value itself.

When the number of learning vehicles is small, the reliability of the learning value is likely to be low. Therefore, the learning unit 120 may discard the learning value associated with the number of learning vehicles equal to or smaller than a threshold value among the learning values stored in the storage unit 140, and calculate the learning value of the sensor 30 mounted in the host vehicle 1-1 using the learning value associated with the number of learning vehicles exceeding the threshold value.

In FIG. 4B, when the learning unit 120 of the host vehicle 1-1 calculates the learning value of the outside air temperature sensor 30 mounted in the host vehicle 1-1 using the learning information acquired from the nearby vehicles 1-2, 1-3, the learning unit 120 sets a weighted average value obtained by weighting the learning value of the outside air temperature sensor 30 mounted in the host vehicle 1-1 and the nearby vehicles 1-2, 1-3 according to the number of learning vehicles, to the learning value of the outside air temperature sensor 30 mounted in the host vehicle 1-1. For example, the learning unit 120 calculates a learning value x^ of the sensor 30 mounted in the host vehicle 1-1 using Equation (1). $x_i$ is a learning value for the sensor 30 mounted in the vehicle 1-$i$, and $w_i$ is the number of learning vehicles with respect to the sensor 30 mounted in the vehicle 1-$i$. In the example of FIG. 4B, when Equation (1) is used, the learning value x^ after learning is (20×5+22×10+24×5)/(5+10+5)=22[1° C.] for the outside air temperature sensor 30 mounted in the vehicle 1-1.

$$\hat{x} = \sum_i \frac{x_i w_i}{w_i} \quad (1)$$

In FIG. 4B, the number of learning vehicles after learning of the host vehicle 1-1 is 5+10+5=20. The number of learning vehicles increases each time learning is performed by acquiring the learning information from the nearby vehicles 1-2, 1-3. Therefore, when the number of learning vehicles of the host vehicle 1-1 exceeds the threshold value, the learning unit 120 may discard the first stored learning value among the learning values stored in the storage unit 140. Further, the storage unit 140 may delete old learning values for which a storage time has passed a predetermined time or more.

Further, when repair or an inspection (vehicle inspection) based on an automobile inspection registration system is performed, the learning information stored in the storage unit 140 may be deleted and the learning value may be reset since an accurate value can be obtained as the learning value. Further, means for enabling the vehicle 1 to acquire the normal value of the sensor 30, for example, by driving a verification vehicle that transmits learning information including a normal value (an accurate learning value) of the sensor 30 or disposing a base station that transmits learning information including the normal value of the sensor 30 can be provided. The vehicle 1 having received the normal value may delete the learning information stored in the storage unit 140 and reset the learning value. When the accurate learning value of the sensor 30 has been acquired, reliability information indicating that the reliability of the learning value is high may be included as the learning information, and the learning unit 120 may calculate the learning value in consideration of the reliability information.

When the sensor 30 is an outside air temperature sensor, it is difficult for the sensor 30 to be influenced by an environment other than an external environment. It is assumed that the external environment is similar between the host vehicle 1-1 and the nearby vehicles 1-2, 1-3. Therefore, for the outside air temperature sensor, learning can be performed using all the learning values of the nearby vehicles 1-2, 1-3. However, for example, since the normal values of the water temperature sensor, the oil temperature sensor, the atmospheric pressure sensor, and the like are different depending on an elapsed time after engine activation, it is desirable for learning to be performed using the learning values of the vehicles having a similar traveling environment among the nearby vehicles 1-2, 1-3. Therefore, a parameter indicating a traveling environment, such as an elapsed time after engine activation, may be included in the learning information, as illustrated in FIG. 4C, in order to make it possible to determine whether or not a traveling environment is similar.

The reliability of the learning value of the nearby vehicle having a large difference in parameter between the nearby vehicle and the host vehicle 1-1 is likely to be low according to a type of sensor 30. Therefore, the learning unit 120 may discard the learning information when the difference in the parameter between the nearby vehicle and the host vehicle 1-1 exceeds the threshold value among the learning information stored in the storage unit 140 according to the type of sensor 30, and calculate the learning value of the sensor 30 mounted in the host vehicle 1-1 using the learning value in which the difference in the parameter between the nearby vehicle and the host vehicle 1-1 is equal to or smaller than the threshold value.

For example, in FIG. 4C, since the difference in the parameter between the host vehicle 1-1 and the nearby vehicle 1-3 is great, the learning unit 120 of the host vehicle 1-1 discards the learning information with respect to the oil temperature sensor 30 acquired from the nearby vehicle 1-3 and calculates the learning value of the oil temperature sensor 30 mounted in the host vehicle 1-1 using the learning information acquired from the nearby vehicle 1-2. With Equation (1) is used, the learning value $\hat{x}$ for the oil temperature sensor 30 mounted in the vehicle 1-1 is (92× 8+90×5)/(8+5)=91.2[° C.], and the number of learning vehicles is 8+5=13.

Thus, in the diagnosis device 10 and the diagnosis method according to the first embodiment, the learning values of the sensors 30 mounted in the nearby vehicles 1-2, 1-3 are acquired, and the learning value of the sensor 30 mounted in the host vehicle 1-1 present in the predetermined range from the nearby vehicles 1-2, 1-3 is calculated using the acquired learning values. In other words, the learning values of the nearby vehicles 1-2, 1-3 present in the predetermined range from the host vehicle 1-1 are acquired and the learning value of the sensor 30 mounted in the host vehicle 1-1 is calculated using the acquired learning values. An operation state of the sensor 30 mounted in the host vehicle 1-1 is diagnosed by comparing the detection value of the sensor 30 mounted in the host vehicle 1-1 with the learning value of the sensor 30. Therefore, according to the first embodiment of the present disclosure, it is possible to correctly estimate the normal value of the sensor 30, and to accurately diagnose the abnormality sign of the sensor 30 mounted in the host vehicle 1-1.

Further, it is possible to diagnose an abnormality sign of the sensor 30 mounted in the host vehicle 1-1 with higher accuracy by selecting the learning value with high reliability from among the learning information acquired from the nearby vehicles 1-2, 1-3 and calculating the learning value of the sensor 30 mounted in the vehicle 1-1 using the selected learning value.

Further, since the learning values acquired from the nearby vehicles 1-2, 1-3 are learning results based on learning information of a plurality of vehicles, for example, the number of learning vehicles increases from 5 to 20 by the vehicle 1-1 receiving the learning information from the nearby vehicles 1-2, 1-3 in the example illustrated in FIG. 4B. Therefore, according to the first embodiment of the present disclosure, even when the learning information is received from a small number of nearby vehicles 1-2, 1-3, it is possible to perform learning based on learning information of a substantially large number of vehicles, and to improve learning speed.

Second Embodiment

Next, a diagnosis device according to a second embodiment will be described. The example in which the diagnosis device 10 is mounted in each vehicle 1 has been shown in the first embodiment, but the diagnosis device 10 according to the second embodiment is included outside the vehicle 1.

FIG. 5 is a diagram illustrating a schematic configuration of a system including the diagnosis device according to the second embodiment. Each vehicle 1 includes an ECU 20, a device (a sensor in the second embodiment) 30, a display unit 50, and a wide area communication unit 60. The server 2 includes a wide area communication unit 21 and a diagnosis device 10. The server 2 may be a cloud server or a data center.

The wide area communication unit 60 modulates the learning information with respect to the sensor 30 mounted in the vehicle 1 using the radio waves in the frequency band assigned in advance and transmits the learning information to the server 2 via a wide area communication network.

The wide area communication unit 21 receives the learning information with respect to the sensors 30 mounted in each vehicle 1 from each vehicle 1 via the wide area communication network using the radio waves in the frequency band assigned in advance, demodulates the learning information, and outputs the demodulated learning information to the diagnosis device 10.

A diagnosis method according to the second embodiment is the same as the diagnosis method of the first embodiment described with reference to FIG. 2. Note that, in the second embodiment, the host vehicle 1-1 means a diagnosis target vehicle, and the nearby vehicles 1-2, 1-3 mean vehicles present in a predetermined range from the diagnosis target vehicle 1-1.

When the diagnosis device 10 performs diagnosis of the sensor 30 mounted in the vehicle 1-1, the learning information acquisition unit 110 acquires the learning information of the diagnosis target vehicle 1-1 and the nearby vehicles 1-2, 1-3 from the wide area communication unit 21, the learning unit 120 calculates the learning value based on the learning information of the diagnosis target vehicle 1-1 and the nearby vehicles 1-2, 1-3, and the diagnosis unit 130 compares a detection value of the diagnosis target vehicle 1-1 with the learning value of the diagnosis target vehicle 1-1 to diagnose an operation state of the sensor 30. A diagnosis result may be stored in the server 2 or may be output to the wide area communication unit 21 and transmitted to the diagnosis target vehicle 1-1.

Thus, the diagnosis device 10 according to the second embodiment is disposed in the server 2 outside the vehicle. Therefore, according to the second embodiment of the present disclosure, it is possible to reduce an amount of communication and a calculation load in the vehicle 1. Further, it is possible to collectively manage a large amount of data of the vehicle 1 within the server 2.

Third Embodiment

Next, a diagnosis system according to a third embodiment will be described. In the diagnosis system according to the third embodiment, the diagnosis device 10 is disposed in each vehicle 1 and the server 2 so that both of each vehicle 1 and the server 2 can diagnose the sensor 30.

Figure 6:
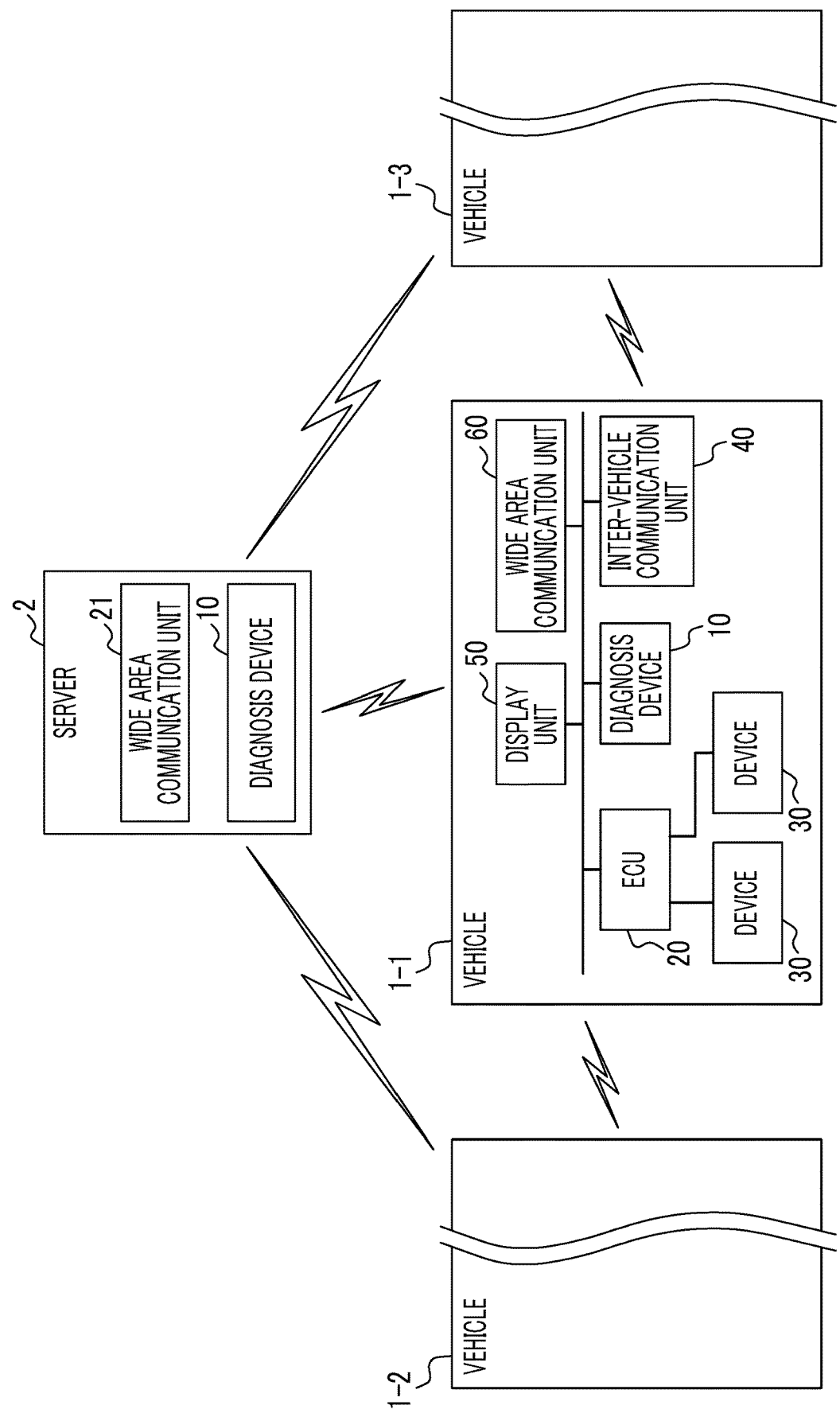
FIG. 6 is a diagram illustrating a schematic configuration of a diagnosis system according to a third embodiment of the present disclosure.

FIG. 6 is a diagram illustrating a schematic configuration of the diagnosis system according to the third embodiment. Each vehicle 1 includes a diagnosis device 10, an ECU 20, a device (a sensor in the third embodiment) 30, an inter-vehicle communication unit 40, a display unit 50, and a wide area communication unit 60. The server 2 includes a wide area communication unit 21 and a diagnosis device 10.

Processing content of the diagnosis device 10 mounted in the vehicle 1 will be described with reference to FIG. 7. FIG. 7 is a flowchart showing an example of a procedure of a diagnosis method using the diagnosis system according to the third embodiment.

When the wide area communication unit 60 succeeds in communication with the server 2 (Yes in step S31), the diagnosis device 10 on the vehicle 1 side acquires a diagnosis result of the diagnosis device 10 disposed in the server 2 from the server 2 (step S32).

On the other hand, when the wide area communication unit 60 has failed in communication with the server 2 due to radio wave failure or failure of the server 2 (No in step S31), the wide area communication unit 60 performs inter-vehicle communication with the nearby vehicles 1-2, 1-3 and acquires learning information of the sensors 30 of the nearby vehicles 1-2, 1-3 (step S11).

A procedure from the acquisition of the learning information is the same as in the first embodiment, and the diagnosis device 10 selects a learning value with high reliability from the acquired learning information (step S12), and calculates the learning value of the sensor 30 of the host vehicle 1-1 using the learning value with high reliability (step S13). The diagnosis device 10 compares the detection value of the host vehicle 1-1 with the calculated learning value (step S14). When both deviate from each other (Yes in step S14), the diagnosis device 10 determines that there is an abnormality sign of the sensor 30 mounted in the host vehicle 1-1 (step S15). When both do not deviate from each other (No in step S14), the diagnosis device 10 determines that there is no abnormality sign of the sensor 30 mounted in the host vehicle 1-1 (step S16).

The learning information acquisition unit 110 of the diagnosis device 10 on the vehicle 1 side performs the processes of steps S31, S32, and S11 described above. That is, the learning information acquisition unit 110 instructs the wide area communication unit 60 to receive the learning information of the nearby vehicles 1-2, 1-3 through communication with the server 2. When the wide area communication unit 60 has failed in communication, the learning information acquisition unit 110 instructs the inter-vehicle communication unit 40 to receive the learning information of the nearby vehicles 1-2, 1-3 through inter-vehicle communication. The learning information acquisition unit 110 acquires the learning information from the inter-vehicle communication unit 40, and outputs the acquired learning value to the storage unit 140.

The learning unit 120 of the diagnosis device 10 on the vehicle 1 side performs the process of the above step S12, as in the first embodiment. That is, the learning unit 120 calculates the learning value of the host vehicle 1-1 based on the learning information input from the learning information acquisition unit 110, and outputs the calculated learning value to the diagnosis unit 130.

The diagnosis unit 130 of the diagnosis device 10 on the vehicle 1 side performs the processes of steps S13 to S15, as in the first embodiment. That is, the diagnosis unit 130 compares the detection value of the host vehicle 1-1 with the learning value input from the learning unit 120 for each sensor 30, determines that there is an abnormality sign of the sensor 30 when a difference between both exceeds a preset threshold value, and determines that there is no abnormality sign of the sensor 30 when the difference between both is equal to or smaller than the threshold value. The diagnosis unit 130 may output the diagnosis result to the display unit 50, the speaker, or the like in the vehicle or may output the diagnosis result to the server 2.

Thus, in the diagnosis system according to the third embodiment, the diagnosis device 10 on the vehicle 1 side acquires the learning information of the nearby vehicles 1-2, 1-3 through the inter-vehicle communication solely when the vehicle 1 has failed in communication with the server 2. Therefore, according to the third embodiment of the present disclosure, it is possible to reduce an amount of communication and a calculation load in the vehicle 1 and to collectively manage a large amount of data of the vehicle 1 within the server 2. Further, even when the vehicle 1 has failed in communication with the server 2, it is possible to acquire the learning information of the nearby vehicles 1-2, 1-3 through inter-vehicle communication and to perform the diagnosis of the sensor 30 mounted in the host vehicle 1-1.

A computer can also be used for a function as the diagnosis device 10. Such a computer can be realized by storing a program describing processing content for realizing each function of the diagnosis device 10 in a storage unit of the computer, and reading and executing the program using a central processing unit (CPU) of the computer.

Further, the program may be recorded in a computer-readable medium. When a computer-readable medium is used, the program can be installed in the computer. Here, the computer-readable medium on which the program has been recorded may be a non-transitory recording medium. The non-transitory recording medium is not particularly limited and may be a recording medium such as a compact disc-read only memory (CD-ROM) or a digital versatile disc-read only memory (DVD-ROM).

Although the embodiments have been described as representative examples, it will be apparent to those skilled in the art that many changes and substitutions can be made within the spirit and scope of the present disclosure. Accordingly, the present disclosure is not construed as being limited by the above-described embodiments, and various modifications or changes are possible without departing from the scope of the claims. For example, it is possible to combine a plurality of constituent blocks or steps described in configuration diagrams of the embodiments into one or to divide one constituent block or step.

What is claimed is:

1. A vehicle comprising:
   a communicator configured to communicate with another vehicle present in a first predetermined range from the vehicle;
   a second device; and
   a processor programmed to:
      acquire a first learning value of a first device mounted in the other vehicle via the communicator;
      calculate a second learning value of the second device using the first learning value; and
      diagnose an operation state of the second device by comparing a detection value of the second device with the second learning value.

2. The vehicle according to claim 1, wherein the processor is programmed to calculate the second learning value using the first learning value when a difference between a detection value of the first device and the first learning value is equal to or smaller than a threshold value.

3. The vehicle according to claim 1, wherein:
   the first learning value is calculated based on a third learning value of a third device mounted in a third vehicle present in a second predetermined range from the other vehicle, and
   the processor is programmed to:
      acquire the first learning value and a number of learning vehicles indicating a number of the third vehicles related to the calculation of the first learning value in association with each other; and
      calculate the second learning value using the first learning value and the number of learning vehicles.

4. The vehicle according to claim 3, wherein the processor is programmed to calculate the second learning value using the first learning value when the number of learning vehicles associated with the first learning value exceeds a threshold value.

5. The vehicle according to claim 3, wherein the processor is programmed to calculate a weighted average obtained by weighting a plurality of first learning values according to the number of learning vehicles, as the second learning value.

6. The vehicle according to claim 1, wherein the processor is programmed to reset the second learning value when the vehicle is repaired or inspected.

7. A diagnosis method comprising:
   using a communicator on a vehicle, acquiring a first learning value of a first device mounted in another vehicle in a predetermined range from the vehicle;
   using a processor on the vehicle, calculating a second learning value of a second device mounted in the vehicle using the first learning value; and
   using the processor on the vehicle, diagnosing an operation state of the second device by comparing a detection value of the second device with the second learning value.

* * * * *